US008012383B2

(12) United States Patent
Matsumoto et al.

(10) Patent No.: US 8,012,383 B2
(45) Date of Patent: *Sep. 6, 2011

(54) METHOD FOR PRODUCING POLARIZING FILM

(75) Inventors: Koji Matsumoto, Niihama (JP); Narutoshi Hayashi, Niihama (JP); Nobuyuki Kurata, Habikino (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1431 days.

This patent is subject to a terminal disclaimer.

(21) Appl. No.: 10/538,492

(22) PCT Filed: Dec. 12, 2002

(86) PCT No.: PCT/JP02/13035

§ 371 (c)(1),
(2), (4) Date: Jun. 9, 2005

(87) PCT Pub. No.: WO2004/053542

PCT Pub. Date: Jun. 24, 2004

(65) Prior Publication Data

US 2006/0244163 A1 Nov. 2, 2006

(51) Int. Cl.
*B29D 7/01* (2006.01)
*B29C 55/04* (2006.01)
*B05D 5/06* (2006.01)
*B05D 3/12* (2006.01)

(52) U.S. Cl. .............. 264/1.34; 264/288.4; 264/289.3; 427/163.1; 427/171

(58) Field of Classification Search .............. 264/1.34, 264/288.4, 289.3, 289.6; 427/171, 163.1
See application file for complete search history.

(56) References Cited

U.S. PATENT DOCUMENTS

| | | | | |
|---|---|---|---|---|
| 2,445,581 A | | 7/1948 | Land | |
| 2,699,994 A | * | 1/1955 | Umberger | 430/370 |
| 3,113,864 A | * | 12/1963 | Yager et al. | 430/372 |
| 3,247,127 A | * | 4/1966 | Bailey | 252/582 |
| 3,254,561 A | * | 6/1966 | Makas | 359/352 |
| 4,166,871 A | | 9/1979 | Schuler | |
| 5,512,178 A | * | 4/1996 | Dempo | 210/638 |
| 6,337,369 B1 | * | 1/2002 | Isozaki | 525/61 |
| 6,353,528 B1 | * | 3/2002 | Hori et al. | 361/502 |
| 6,682,667 B1 | * | 1/2004 | Matviya | 264/29.4 |
| 2003/0197939 A1 | * | 10/2003 | Tsuchimoto et al. | 359/491 |
| 2004/0089960 A1 | * | 5/2004 | Isozaki et al. | 264/1.34 |
| 2008/0022940 A1 | * | 1/2008 | Kirsch et al. | 119/173 |
| 2009/0126127 A1 | * | 5/2009 | Sadamitsu et al. | 8/506 |
| 2009/0128745 A1 | * | 5/2009 | Ikeda et al. | 349/96 |
| 2009/0237786 A1 | * | 9/2009 | Yoshihara et al. | 359/488 |
| 2010/0045910 A1 | * | 2/2010 | Bitou et al. | 349/118 |
| 2010/0226008 A1 | * | 9/2010 | Higeta et al. | 359/491 |
| 2010/0245744 A1 | * | 9/2010 | Yoshida et al. | 349/118 |

FOREIGN PATENT DOCUMENTS

| | | |
|---|---|---|
| CN | 1220735A A | 6/1999 |
| EP | 0000209 A1 | 1/1979 |
| EP | 0926515 A1 | 6/1999 |
| EP | 1089093 A2 | 4/2001 |
| JP | 11-49878 A | 2/1999 |
| JP | 2001-290027 A | 10/2001 |
| JP | 2001-311827 | 11/2001 |
| JP | 20010311827 A | * 11/2001 |

OTHER PUBLICATIONS

English translation of relevant parts of JP 2001-311827 (published Nov. 9, 2001), 13 pages.
English translation of relevant parts of JP 2001-311827 (published Nov. 9, 2001) including English translation of Paragraph [0019], 14 pages.

* cited by examiner

*Primary Examiner* — Joseph S Del Sole
*Assistant Examiner* — Nahida Sultana
(74) *Attorney, Agent, or Firm* — Birch, Stewart, Kolasch & Birch, LLP

(57) ABSTRACT

A method for producing a polarizing film comprising the step of dipping a polyvinyl alcohol film in/on which iodine is adsorbed and oriented in an aqueous solution containing boric acid wherein the aqueous solution has an absorbance of 0.13 or less at a wavelength of 450 nm. The produced polarizing film has a high contrast.

6 Claims, No Drawings

METHOD FOR PRODUCING POLARIZING FILM

TECHNICAL FIELD

The present invention relates to a method for producing an iodine type polarizing film which exhibits a high contrast.

BACKGROUND ART

Nowadays, as polarizing films, generally, a polyvinyl alcohol base film (PVA film) in/on which iodine is adsorbed and oriented, a PVA film in/on which a dichroic dye is adsorbed and oriented, and the like are known. Such a polarizing film is usually used in the form of a polarizing plate comprising the polarizing film and a protective film adhered to at least one surface, preferably to both surfaces of the polarizing film.

Among those polarizing films, an iodine type polarizing film is usually produced by dipping a PVA film in/on which iodine is adsorbed and oriented in an aqueous solution containing boric acid and widely used as a part of a liquid crystal display since it has a higher light transmittance and a higher degree of polarization, that is, a better contrast than the dyestuff type polarizing film.

In these years, with the expansion of the application fields of liquid crystal displays and the progress of the peripheral technologies, the requirements for the optical properties and performances of the polarizing plate become higher and higher. That is, in the case of liquid crystal displays which are used outdoors or require low electricity consumption, polarizing films having high transparency and a high degree of polarization, that is, a high contrast are required. However, the currently available iodine type polarizing films do not necessarily satisfy those requirements sufficiently.

DISCLOSURE OF THE INVENTION

As the result of extensive studies to solve those problems of the conventional iodine type polarizing films, it has been found that an iodine type polarizing film having a high contrast can be produced by reducing an absorbance of an aqueous solution containing boric acid at a wavelength of 450 nm to a certain value or less when a PVA film in/on which iodine is adsorbed and oriented is treated with the aqueous solution containing boric acid.

Accordingly, the present invention provides a method for producing a polarizing film comprising the step of dipping a polyvinyl alcohol film in/on which iodine is adsorbed and oriented in an aqueous solution containing boric acid wherein the aqueous solution has an absorbance of 0.13 or less at a wavelength of 450 nm.

The PVA film to be used in the present invention may be obtained by making a film from polyvinyl alcohol or saponified ethylene-vinyl acetate copolymers, which may optionally comprise a small amount of other comonomer. Examples of the other comonomer include unsaturated carboxylic acids (e.g. acrylic acid, methacrylic acid, ethyl acrylate, n-propyl acrylate, methyl methacrylate, etc.), olefins (e.g. ethylene, propylene, 1-butene, 2-methylpropylene, etc.), vinyl ethers (e.g. ethyl vinyl ether, methyl vinyl ether n-propyl vinyl ether, isopropyl vinyl ether, etc.), unsaturated sulfonic acids (e.g. vinylsulfonate, sodium vinylsulfonate, etc.) and the like.

The PVA resins usually have a polymerization degree of about 1,000 to about 10,000, preferably about 1,500 to about 5,000.

The PVA resins usually have a saponification degree of about 85 to 100% by mole, preferably about 98 to 100% by mole.

The PVA films may be produced by any conventional method for producing the films of the PVA resins, and the production methods are not limited.

The thickness of the PVA film is not limited, and may be from about 30 μm to about 150 μm.

The iodine type polarizing film to be used in the present invention may be produced from a PVA film by any conventional method. For example, an unstretched PVA film is uniaxially stretched in an aqueous solution and then dipped in a solution containing iodine and potassium iodide, an unstretched PVA film is dipped in a solution containing iodine and potassium iodide and then uniaxially stretched, an unstretched PVA film is uniaxially stretched in a solution containing iodine and potassium iodide, an unstretched PVA film is stretched at suitable stretch ratios in a plurality of dipping steps, or an unstretched PVA film is uniaxially stretched in a dry state and then dipped in a solution containing iodine and potassium iodide.

The total stretch ratio, that is, a ratio of the length of the finally stretched PVA film to that of the original unstretched PVA film, is usually from 3 to 7 times, preferably from 4 to 6 times.

The PVA film may be stretched in a direction perpendicular to the above uniaxial stretching direction using a suitable apparatus such as an expender roll or a cloth guider in the process for producing the polarizing film.

The composition of the solution containing iodine and potassium iodide is such that a weight ratio of water:iodine:potassium iodide is 100:(0.005-0.5):(0.5-10). Optionally, the solution may contain a third component such as boric acid, zinc iodide, etc. When this solution contains boric acid, it is not regarded as an aqueous solution containing boric acid in which the PVA film in/on that iodine is adsorbed and oriented is dipped according to the present invention.

The temperature of the solution containing iodine and potassium iodide is usually from about 20° C. to about 50° C.

Then, the PVA film in/on which iodine is adsorbed and oriented is treated with the aqueous solution containing boric acid by dipping the PVA film in the aqueous solution.

The composition of the aqueous solution containing boric acid and potassium iodide is such that a weight ratio of water:boric acid:potassium iodide is usually 100:(2-15):(2-20), preferably 100:(4-12):(5-15), more preferably 100:(5-12):(6-12). Optionally, the aqueous solution may contain zinc chloride, zinc iodide, etc. Furthermore, one or more metal iodide other than potassium iodide, for example, zinc iodide may be used in addition to or in place of potassium iodide.

The temperature of the aqueous solution containing boric acid is usually at least 50° C., preferably from 55° C. to 85° C., more preferably from 60° C. to 80° C.

The treating time of the PVA film with the aqueous solution containing boric acid is not limited, and may be from 60 to 1,200 seconds, preferably from 120 to 600 seconds, more preferably from 150 to 500 seconds.

During the treatment with the aqueous solution containing boric acid, the PVA film in/on which iodine is adsorbed and oriented may optionally be further stretched uniaxially.

The treatment with the aqueous solution containing boric acid may be carried out in plural steps using plural treating paths. In such a case, the conditions in the plural treating steps such as the temperature, the concentration of the solution and/or the stretch ratio may be the same or different.

When the PVA film in/on which iodine is adsorbed and oriented is continuously treated with the aqueous solution containing boric acid, the aqueous solution is colored, for example, by the elution of iodine from the PVA Film in/on which iodine is adsorbed and oriented.

According to the present invention, the aqueous solution containing boric acid preferably has a lower absorbance at a wavelength of 450 nm. The absorbance of the aqueous solution containing boric acid is usually 0.13 or less, preferably 0.08 or less, more preferably 0.05 or less.

The absorbance of the aqueous solution containing boric acid can be decreased by physical methods, chemical methods or electrochemical methods.

Examples of the physical methods include a method comprising flowing the aqueous solution containing boric acid in a column containing activated carbon or an adsorbing resin (for example, absorbing resin DUOLITE S-872, S-873, S-876 and S-877, all available from Sumitomo Chemical Co., Ltd.) to allow iodine to be adsorbed on activated carbon or the adsorbing resin, a method comprising blowing an inactive gas such as nitrogen or argon through the aqueous solution containing boric acid to sublimate iodine having a relatively low vapor pressure in the inactive gas, and the like.

Examples of the chemical methods include a method comprising flowing the aqueous solution containing boric acid in an ion-exchange resin (for example, anion-exchange resin DUOLITE A-116 PLUS, A-113 PLUS, A-161 and A-162, all available from Sumitomo Chemical Co., Ltd.) to remove iodine, a method comprising adding a reducing agent having an oxidation-reduction potential on the more negative side in comparison with that of iodine-iodide ion (E=+0.54 V vs. NHE) (for example, sulfurous acid, sulfites, copper, nickel, cobalt, zinc, iron, chromium, lead, ascorbic acid or salts thereof, thiosulfates, etc.) to reduce and remove iodine in the aqueous solution containing boric acid, and the like.

Examples of the electrochemical methods include a method comprising inserting an electrode in the aqueous solution containing boric acid and controlling the potential of the electrode at a sufficient level to induce the reduction of iodine to reduce and remove iodine in the aqueous solution containing boric acid on the electrode, and the like. In this case, an ion-exchange membrane is preferably used in combination with the above method.

Optionally, a pH adjuster such as sulfuric acid may be added to the solution.

Preferably, the contact between the solution and an air is prevented with nitrogen gas or resin balls to suppress the liberation of iodine caused by autoxidation of iodide ions in the aqueous solution.

In the method of the present invention, the aqueous solution containing boric acid, which is already used, may be recycled while maintaining the absorbance of the solution at a wavelength of 450 nm in a range of 0.13 or less.

When the treatment with the aqueous solution containing boric acid is carried out in a plurality of the dipping baths, preferably, the aqueous solutions in all the baths have an absorbance of 0.13 or less.

The absorbance of the aqueous solution containing boric acid is measured with a commercially available UV-visible light spectrophotometer using a cell having a cross sectional area of 1 cm square, preferably made of quartz. When a cell having a cross sectional area other than 1 cm square, the absorbance of the aqueous solution containing boric acid at a wavelength of 450 nm is converted to a value per 1 cm with the assumption that the absorbance follows the Lambert's law.

Preferably, the absorbance is quickly measured after sampling while the absorbance at a wavelength of 450 nm is not changed by the sublimation of iodine in the aqueous solution containing boric acid or the autoxidation of iodide ions in the aqueous solution containing boric acid or while boric acid is not precipitated by the lowering of the temperature of the aqueous solution containing boric acid. For examples, the measurement is carried out at a liquid temperature of at least 40° C. within two minutes from the sampling of the solution. The measurement may be carried out intermittently or continuously. The continuous measurement is preferable.

The stretched PVA film which has been treated with the aqueous solution containing boric acid may be post-treated by conventional methods such as washing with water, drying, etc. to obtain the polarizing film.

Then, a protective film is laminated on at least one surface of the polarizing film obtained by the above steps to provide the polarizing plate. Examples of the protective film include films of cellulose acetates (e.g. triacetylcellulose, diacetylcellulose, etc.), polycycloolefin films (e.g. polynorbornene films, etc.), acrylic resin films, polyester resin films, polyolefin resin films, polycarbonate resin films, polyarylate resin films, polyether sulfone resin films, and the like.

The protective film may have a function as a retardation film, a function as a reflective polarizing film (e.g. DBEF available from 3M Company), etc. Such a protective film may be adhered to one or both of the surfaces of the polarizing film.

According to the present invention, the iodine type polarizing film having a higher contrast than the conventional iodine type one can be easily produced. Furthermore, the method of the present invention can be easily carried out continuously and can stably produce the polarizing films with good productivity.

EXAMPLES

The present invention will be illustrated by the following examples, which do not limit the scope of the invention in any way.

The polarizing films obtained in the Examples were evaluated by the following method:

A transmittance through a pair of polarizing films each carrying protective films adhered to the both surfaces, which are superposed on one another so that the absorbing axes are aligned in the same direction, is referred to as a parallel position transmittance Tp, while a transmittance through a pair of the polarizing films, which are superposed on one another so that the absorbing axes are perpendicular each other, is referred to as perpendicular position transmittance Tc. A transmittance through a single polarizing film is referred to as a single transmittance Ts.

Here, a transmittance T was calculated from spectral transmittances $\tau(\lambda)$ measured at every 10 nm in the range between 400 nm and 700 nm according to the following equation (1)

$$T = \frac{\int_{400}^{700} P(\lambda) y(\lambda) \tau(\lambda) d\lambda}{\int_{400}^{700} P(\lambda) y(\lambda) d\lambda} \qquad (1)$$

wherein $P(\lambda)$ is a spectral distribution of a standard light (C light source) and $y(\lambda)$ is a two-degree visual filed isochromatic function.

The spectral transmittances $T(\lambda)$ were measured with a spectrophotometer (UV-2200 manufactured by Shimadzu Corporation) T, which was obtained by assigning the spectral transmittances for Tp, Tc or Ts, respectively in $\tau(\lambda)$, was Tp, Tc or Ts, respectively.

From the parallel transmittance Tp and the perpendicular transmittance Tc obtained, a contract Cr was calculated according to the following equation (2):

$$Cr = Tp/Tc$$

The absorbance of the aqueous solution containing boric acid at a wavelength of 450 nm was measured with a spectrophotometer (UV-2200 manufactured by Shimadzu Corporation) by pouring the solution in a quartz cell having a cross section of 1 cm square (1 cm×1 cm).

Example 1

A PVA film having an average polymerization degree of 2,400, a saponification degree of 99.9% by mote or more and a thickness of 75 μm was uniaxially stretched in a dry state at a stretch ratio of 5 to obtain a stretched PVA film. Then, a continuous web of the stretched PVA film, which was maintained in the stretched state, was successively dipped in pure water at 60° C. for 60 seconds, in an aqueous solution having a weight ratio of iodine:potassium iodide:water of 0.05:5:100 at 28° C. for 60 seconds and then in an aqueous solution having a weight ratio of potassium iodide:boric acid:water of 6:7.5:100 at 73° C. for 300 seconds, washed with pure water at 15° C. for 10 seconds, and dried at 50° C. for about 4 minutes to obtain an iodine type polarizing film.

In this Example, the absorbance of the aqueous solution containing boric acid at a wavelength of 450 nm was 0.05.

The continuous web of the polarizing film was supplied to the following step without cutting:

A PVA base-adhesive was applied to the both surfaces of the polarizing film prepared in the previous steps, and then protective films of triacetylcellulose each having a thickness of 80 μm, the surfaces of which were saponified ("FUJITACK UV80" available from Fuji Photo Film Co., Ltd.), were adhered to he respective surfaces of the polarizing film, followed by drying at 50° C. for 5 minutes to obtain a polarizing plate, which had Ts of 43.9% and a contrast of 2,047.

Example 2

A polarizing plate was produced in the same manner as in Example 1 except that the absorbance of the aqueous solution containing boric acid was 0.08. The polarizing plate had Ts of 44.0% and a contrast of 1,773.

Example 3

A PVA film having an average polymerization degree of 2,400, a saponification degree of 99.9% by mole or more and a thickness of 75 μm (VF-PS #7500 manufactured by KURARAY CO., LTD.) was uniaxially stretched at a stretch ratio of 1.56 while dipping the film in a pure water at 30° C. for 2 minutes and then stretched in an air at 23° C. at a stretch ratio of 1.49. Thereafter, the film was stretched at a stretch ratio of 1.72 while dipping the film in an aqueous solution having a weight ratio of iodine:potassium iodide:water of 0.08:3:100 at 30° C. for 60 seconds and then further stretched at a stretch ratio of 1.44 while dipping the film in an aqueous solution having a weight ratio of potassium iodide:boric acid: water of 8.3:5.1:100 at 61° C. for 300 seconds. In this treatment step, the absorbance of the aqueous solution containing boric acid at a wavelength of 450 nm was 0.04.

Thereafter, the film was washed with pure water at 6° C. for 10 seconds, and then was dried at 50° C. to obtain an iodine type polarizing film.

A PVA base adhesive was applied to the both surfaces of the polarizing film prepared in the previous steps, and then protective films of triacetylcellulose each having a thickness of 80 μm, the surfaces of which were saponified ("FUJITACK UV80" available from Fuji Photo Film, Co., Ltd.), were adhered to the respective surfaces of the polarizing film, followed by drying at 50° C. for 5 minutes to obtain a polarizing plate, which had Ts of 43.7% and a contrast of 3,827.

Comparative Example 1

A polarizing plate was produced in the same manner as in Example 1 except that the absorbance of the aqueous solution containing boric acid was 0.2. The polarizing plate had Ts of 43.7% and a contrast of 696.

Comparative Example 2

A polarizing plate was produced in the same manner as in Example 3 except that the absorbance of the aqueous solution containing boric acid was 0.15. The polarizing plate had Ts of 43.8% and a contrast of 689.

The invention claimed is:

1. A method for producing a polarizing film comprising the step of supplying a polyvinyl alcohol film in/on which iodine is adsorbed and oriented in an aqueous solution containing boric acid and dipping and treating said polyvinyl alcohol film with said aqueous solution, wherein an absorbance of said aqueous solution at a wavelength of 450 nm is maintained in a range of 0.13 or less by continuously or intermittently treating said aqueous solution with activated carbon.

2. The method according to claim 1, wherein said aqueous solution containing boric acid is recycled while maintaining the absorbance of the aqueous solution at a wavelength of 450 nm in a range of 0.13 or less.

3. The method according to claim 1, wherein a weight ratio of water:boric acid:potassium iodide in said aqueous solution containing boric acid is usually 100:(2-15):(2-20).

4. The method according to claim 1, wherein a temperature of said aqueous solution containing boric acid is from 55° C. to 85° C., and a dipping time is from 90 seconds to 1,200 seconds.

5. The method according to claim 1, wherein said polyvinyl alcohol has a polymerization degree of 1,500 to 5,000.

6. The method according to claim 1, wherein said polyvinyl alcohol film in/on which iodine is adsorbed and oriented is a film produced by uniaxially stretching an unstretched polyvinyl alcohol film in water and then dipping it in a solution containing iodine and potassium iodide, a film produced by dipping an unstretched polyvinyl alcohol film in a solution containing iodine and potassium iodide and then uniaxially stretching it, a film produced by uniaxially stretching an unstretched polyvinyl alcohol film in a solution containing iodine and potassium iodide, a film produced by uniaxially stretching an unstretched polyvinyl alcohol film in a plurality of dipping steps, or a film produced by uniaxially stretching an unstretched polyvinyl alcohol film in a dry state and then dipping it in a solution containing iodine and potassium iodide.

* * * * *